US006838987B1

(12) United States Patent
Quinonez

(10) Patent No.: US 6,838,987 B1
(45) Date of Patent: Jan. 4, 2005

(54) VEHICLE LOCATING SYSTEM

(76) Inventor: Richard Quinonez, 23475 Gerbera St., Moreno Valley, CA (US) 92553

( * ) Notice: Subject to any disclaimer, the term of this patent is extended or adjusted under 35 U.S.C. 154(b) by 145 days.

(21) Appl. No.: 10/361,337

(22) Filed: Feb. 10, 2003

(51) Int. Cl.[7] .............................. G08B 1/08; H04Q 7/00

(52) U.S. Cl. .............................. 340/539.13; 340/539.21

(58) Field of Search ....................... 340/539.13, 539.21, 340/932.2, 988, 990, 425.5; 342/457

(56) References Cited

U.S. PATENT DOCUMENTS

| | | | | | |
|---|---|---|---|---|---|
| 5,278,556 | A | | 1/1994 | Oh | 340/988 |
| 5,771,002 | A | * | 6/1998 | Creek et al. | 340/539.21 |
| 5,786,758 | A | | 7/1998 | Bullock | 340/539 |
| 6,127,920 | A | | 10/2000 | Chen | 340/425.5 |
| 6,127,931 | A | | 10/2000 | Mohr | 340/573.4 |
| 6,147,602 | A | * | 11/2000 | Bender | 340/568.1 |
| 6,429,791 | B2 | * | 8/2002 | Quinn | 340/932.2 |
| 6,518,882 | B2 | * | 2/2003 | Johnson et al. | 340/539.1 |
| 6,529,131 | B2 | * | 3/2003 | Wentworth | 340/573.1 |
| 6,529,142 | B2 | * | 3/2003 | Yeh et al. | 340/988 |
| 6,590,534 | B1 | * | 7/2003 | Kroll et al. | 342/442 |

* cited by examiner

*Primary Examiner*—John Tweel
(74) *Attorney, Agent, or Firm*—Goldstein Law Offices, P.C.

(57) ABSTRACT

A vehicle locating system, comprising a hand-held transponder in communication with a vehicle-installed transponder. The hand-held transponder is carried by a user upon exiting a vehicle. The vehicle-installed transponder remains within the vehicle. The hand-held transponder includes an activation signal generator and a homing signal receiver. Correspondingly, the vehicle-installed transponder includes an activation signal receiver and a homing signal generator. Upon receipt of an activation signal from the hand-held transponder, the homing signal generator emits a homing signal which is detected by the homing signal receiver located within the hand-hold transponder. A signal strength controlled modulator causes a speaker within the hand-held transponder to emit sound and also causes a light emitting diode to emit light, such that the period of the emitted sound and light is proportional to the distance between the hand-held transponder and the vehicle-installed transponder, thereby allowing a user to easily locate the vehicle.

7 Claims, 3 Drawing Sheets

VEHICLE LOCATING SYSTEM

BACKGROUND OF THE INVENTION

1. Field of the Invention

The invention generally relates to a vehicle locating system, and in particular relates to a vehicle locating system having a hand-held transponder in communication with a vehicle-installed transponder.

2. Description of the Related Art

Drivers of automobiles frequently have difficulty locating their vehicle after it has been parked in a parking lot, parking garage, or on the streets. This may be because they have forgotten where the vehicle is parked. The problem is exacerbated when there are a great many other vehicles parked within the same general area. Accordingly, there is a need for a device which may be carried by the driver upon exiting the vehicle which helps the driver relocate the vehicle at a later time.

A variety of electronic location devices are available. U.S. Pat. No. 6,127,920 to Chen appears to show a remote keypad device capable of activating a light or alarm to assist a user in locating a vehicle. However, Chen appears to show a device in which the light and sound emitting indicator is positioned within the vehicle itself, thereby limiting its usefulness to situations in which the vehicle is close enough to the user for emitted sound and light to be heard or seen by the user.

Additionally, U.S. Pat. No. 5,278,556 to oh appears to show a remote control device for activating an alarm device placed inside an automobile to provide identification in a dark parking lot. However, Oh appears to be primarily directed to a system in which identification of a vehicle is possible by emission of light from an indicator within the vehicle itself, and hence, its usefulness is also limited to situations in which the vehicle is close enough to the user for emitted light to be seen by the user.

Furthermore, U.S. Pat. No. 5,786,758 to Bullock appears to show a vehicle locating system comprised of a remote unit suited to activate a vehicle-installed light source. Accordingly, Bullock is also unable to direct a user to a vehicle unless the user has an unobstructed view of the vehicle.

U.S. Pat. No. 6,127,931 to Mohr appears to show a remote tracking system comprised of a homing unit and a base unit for monitoring children. Mohr, however, appears to describe a system which is activated when the homing unit has moved a distance greater than the predetermined distance from the base unit, and hence is not well suited for determining the location of a vehicle.

None of these devices appear to show a vehicle locating system having a hand-held transponder in communication with a vehicle-installed transponder, wherein the hand-held transponder is capable of changing the period of emitted sound and flashing lights relative to the distance and direction of the vehicle-installed transponder.

While these units may be suitable for the particular purpose employed, or for general use, they would not be as suitable for the purposes of the present invention as disclosed hereafter.

SUMMARY OF THE INVENTION

It is an object of the invention to produce a vehicle locating system which enables a driver to easily locate a vehicle whose whereabouts are unknown. Accordingly, the vehicle locating system has a hand-held transponder which is used to activate a vehicle-installed transponder so that it produces a homing signal from the vehicle, wherein the hand-held transponder emits light and sound of a shorter period as it approaches the vehicle-installed transponder, thereby allowing the driver to easily locate the vehicle.

It is another object of the invention to produce a vehicle locating system which indicates the direction in which the vehicle is located, as well as the distance between the user and the vehicle. Accordingly, when the hand-held transponder is pointed in the direction of the homing signal emitted by the vehicle-installed transponder, the received signal strength is at its greatest and the hand-held transponder emits an uninterrupted tone and a steady, uninterrupted beam of light, thereby indicating the precise direction in which the vehicle is located.

It is additionally an object of the invention to produce a vehicle locating system which may be used with any existing vehicle. Accordingly, the vehicle-installed transponder may be easily mounted inside an existing automobile.

The invention is a vehicle locating system, comprising a hand-held transponder in communication with a vehicle-installed transponder. The hand-held transponder is carried by a user upon exiting a vehicle. The vehicle-installed transponder remains within the vehicle. The hand-held transponder includes an activation signal generator and a homing signal receiver. Correspondingly, the vehicle-installed transponder includes an activation signal receiver and a homing signal generator. Upon receipt of an activation signal from the hand-held transponder, the homing signal generator emits a homing signal which is detected by the homing signal receiver located within the hand-held transponder. A signal strength controlled modulator causes a speaker within the hand-held transponder to emit sound and also causes a light emitting diode to emit light, such that the period of the emitted sound and light is proportional to the distance between the hand-held transponder and the vehicle-installed transponder, thereby allowing a user to easily locate the vehicle.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
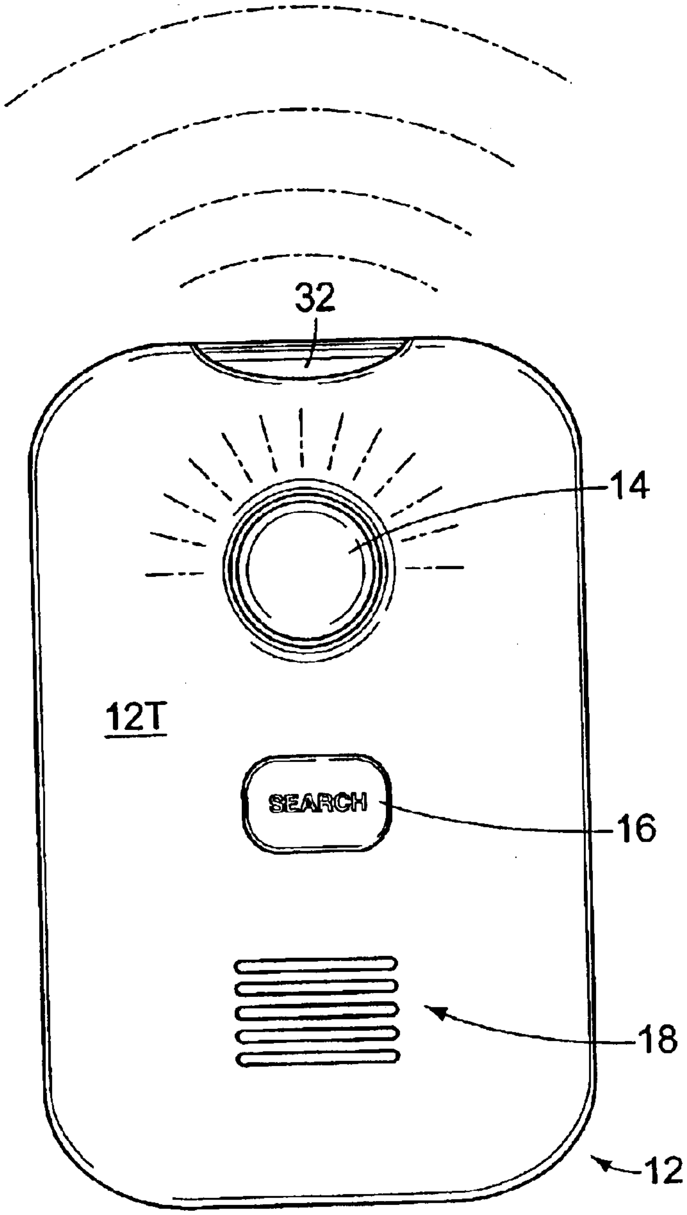
FIG. 1 is a top plan view of the hand-held transponder which comprises a portion of the vehicle locating system.
Figure 3:
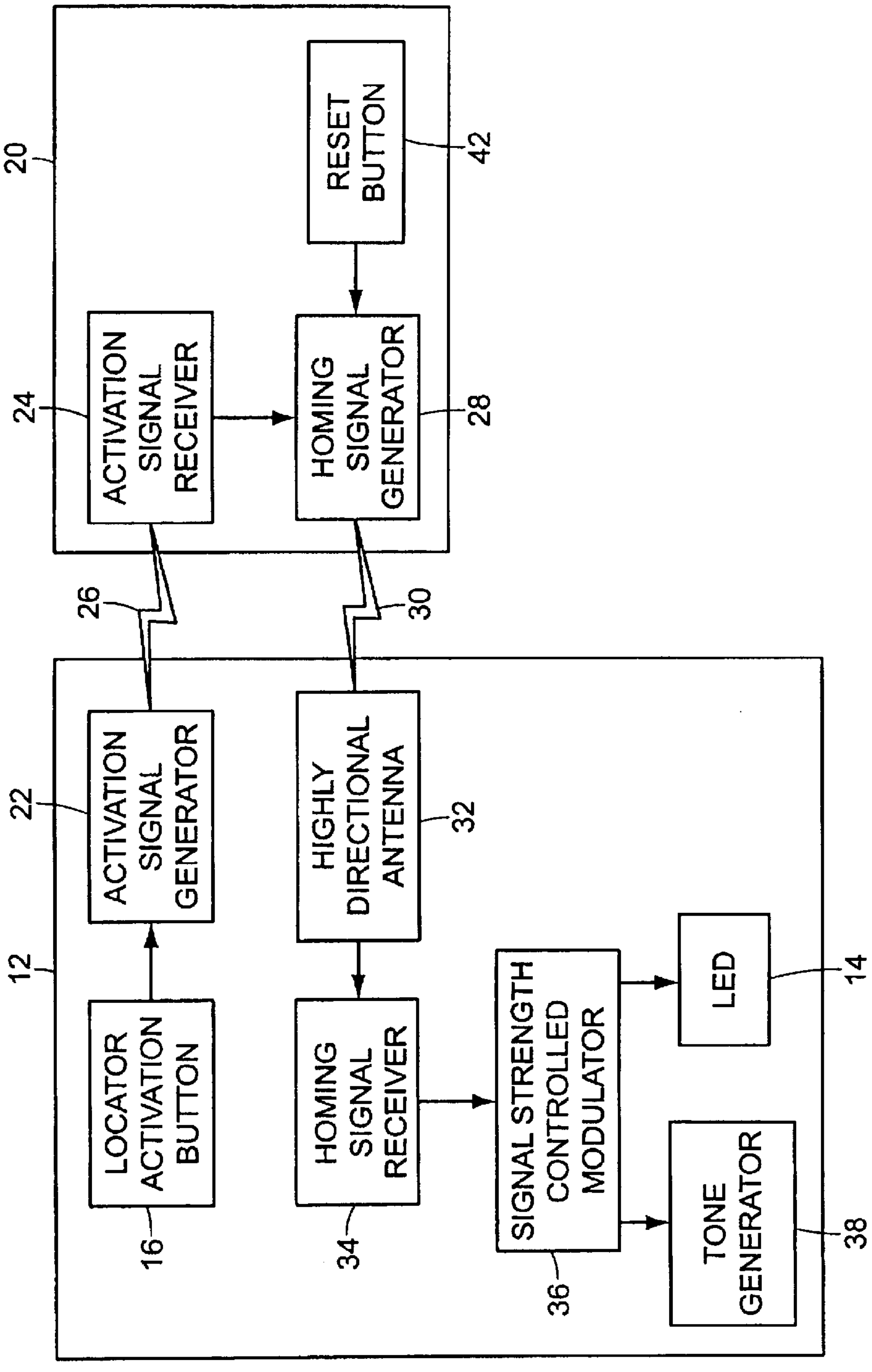
FIG. 3 is a block diagram illustrating the interconnection of various electrical components of the invention.

Turning momentarily to FIG. 3, the vehicle locating system 10 comprises both a hand-held transponder 12 and a vehicle-installed transponder 20. The hand-held transponder 12 is carried by a user upon exiting a vehicle. The vehicle-installed transponder 20 is left within the vehicle. The hand-held transponder 12 and the vehicle-installed transponder 20 communicate with one another by selective receipt and transmission of radio frequency signals. FIG. 1 illustrates a top plan view of the hand-held transponder 12, having a top surface 12T, and a bottom surface. The top surface 12T has a locator activator button 16, a speaker 18, a light emitting diode (LED), and a highly directional antenna 32. The speaker 18 emits sound whose period varies depending on the strength of the signals received from the vehicle-installed transponder 20. At a greater distance, a weaker signal will be received. Consequently, at a greater distance the emitted sound will be an intermittent “beeping” tone. Conversely, as the vehicle-installed transponder 20 and the hand held-transponder 12 approach one another, the period of sound emitted by the hand-held transponder 12 will decrease. Accordingly, the emitted tone will become steadier and less intermittent as the hand-held transponder 12 approaches the vehicle-installed transponder 20. Analogously, the LED emits a flashing light when the hand-held transponder 12 is separated by a substantial distance from the vehicle-installed transponder 20. This flashing light gradually becomes a steady beam of light as the hand-held transponder 12 more closely approaches the vehicle.

Figure 2:
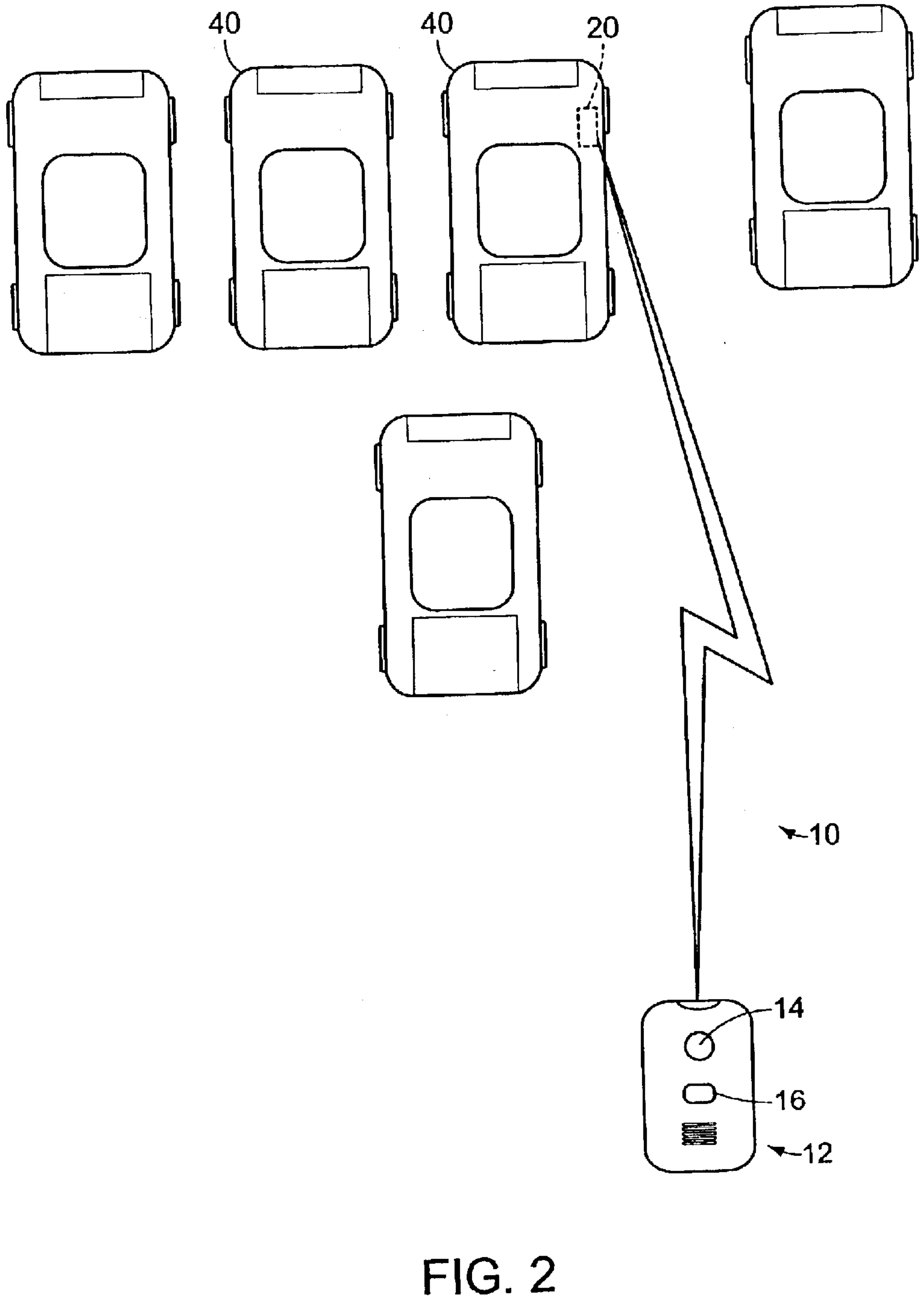
FIG. 2 is a top plan view diagrammatically illustrating the hand-held transponder in communication with a vehicle-installed transponder.

FIG. 2 is a schematic illustration of the vehicle locating system 10 being used to locate a vehicle 40. The hand-held transponder 12 is in communication with the vehicle-installed transponder 20, which has been positioned within the vehicle 40. As the hand-held transponder 12 more closely approaches the vehicle 40, the sound emitted by the speaker 18 located within the hand-held transponder 12 becomes a steadier, less intermittent tone, and the flashing light emitted by the LED becomes a steadier beam of light.

FIG. 3 is a block diagram illustrating the interconnection of various electrical components of the invention. In particular, it illustrates the interconnection between the hand-held transponder 12 and the vehicle-installed transponder 20 and it indicates the various components of each. The hand-held transponder 12 has an activation signal generator 22 which produces an activation signal 26 and also a homing signal receiver 34 for selective receipt of signals from the vehicle-installed transponder 20. Correspondingly, the vehicle-installed transponder 20 has an activation signal receiver 24 and a homing signal generator 28. The activation signal generator 22 within the hand-held transponder 12 communicates with the activation signal receiver 24 located within the vehicle-installed transponder 20 via transmission of the activation signal 26. Upon receipt of the activation signal 26, the homing signal generator 28 produces a homing signal 30. The hand-held transponder 12 has a highly directional antenna 32 which receives the homing signal 30, and directs the homing signal 30 to the homing signal receiver 34, which tunes and isolates the homing signal 30 from the radio frequency signals. The hand-held transponder 12 further has a signal strength controlled modulator 36, a tone generator 38, and a light emitting diode (LED) 14. The signal strength controlled modulator 36 modulates the audible and visual alerts produced by the LED 14 and the tone generator 38 proportional to the strength of the homing signals 30 detected by the homing signal receiver 34. The signal strength controlled modulator 36 thereby selectively causes the tone generator 38 to emit sound waves, and also causes the LED 14 to emit light, upon receipt of the homing signal 30 from the vehicle-installed transponder 20. In particular, the signal strength controlled modulator 36 creates an intermittent output upon the presence of a weak signal, which becomes steadier as the detected signal strength increases. Thus, the emitted sound, initially a series of discrete tones, varies to a single, steady tone as the hand-held transponder 12 approaches the vehicle-installed transponder 20. The tone is produced by the speaker 18 located within the hand-held transponder 12. Analogously, the LED 14 is modulated by the signal strength output from the homing signal receiver 34 such that it produces a flashing light when the hand-held transponder 12 is substantially separated from the vehicle-installed transponder 20, and a steady, uninterrupted beam of light as the hand-held transponder 12 approaches the vehicle-installed transponder 20. The user may therefore easily locate the vehicle by walking in the direction which produces a steadier, less intermittent tone, and a steadier beam of light.

The hand-held transponder 12 further has a locator activation button 16 for allowing its user to selectively activate the activation signal generator 22. The vehicle transponder 20 further has a reset button 42 which is pressed after the user locates the vehicle, thereby terminating the emission of the homing signal 30 until needed for locating the vehicle on the next occasion.

In use, a user carries the hand-held transponder 12 upon exiting the vehicle, and leaves the vehicle-installed transponder 20 within the vehicle. When the user needs to locate the vehicle at a later time, the user presses the locator activation button 16, thereby causing the activation signal generator 22 to produce an activation signal 26. Receipt of the activation signal 26 by the activation signal receiver 24 located within the vehicle-installed transponder 20 causes the homing signal generator 28 to generate a homing signal 30, which is then received by the highly directional antenna 32 located upon the hand-held transponder 12 when the antenna 32 is pointed toward the vehicle-installed transponder 20. The antenna 32 directs the homing signal 30 the homing signal receiver 34. The homing signal 30 thus isolated controls the signal strength controlled modulator 36, which controls sound waves created by the speaker and the tone generator 38, and controls light from the LED 14. A steadier tone and a steadier beam of light are produced as the hand-held transponder 12 approaches the vehicle-installed transponder 20.

In conclusion, herein is presented a vehicle locating system having a hand-held transponder in communication with a vehicle-installed transponder, for use in locating a vehicle whose whereabouts are unknown. The invention is illustrated by example in the drawing figures, and throughout the written description. It should be understood that numerous variations are possible, while adhering to the inventive concept. Such variations are contemplated as being a part of the present invention.

What is claimed is:

1. A vehicle locating system, for locating a vehicle whose whereabouts are unknown, comprising:

a hand-held transponder which is carried by a user upon exiting the vehicle, said hand-held transponder having an activation signal generator for selective production of an activation signal, a homing signal receiver, a tone generator, and a signal strength controlled modulator which operates in response to the homing signal receiver, wherein the tone generator is selectively modulated by the signal strength controlled modulator; and a vehicle-installed transponder which is positioned within the vehicle, having an activation signal receiver and a homing signal generator, wherein said activation signal receiver communicates with the activation signal generator located within the hand-held transponder, wherein receipt of the activation signal causes the homing signal generator to produce a homing signal which is transmitted for receipt by the homing signal receiver within the hand-held transponder, wherein said homing signal modulates the tone generator to output either a series of discrete tones or one steady, uninterrupted tone, wherein production of an intermittent tone occurs when the vehicle is located at a substantial distance from the hand-held transponder and a weak homing signal is isolated by the homing signal receiver, and wherein the tone becomes steadier and less intermittent as the hand-held transponder approaches the vehicle and a strong signal is received by the homing signal receiver.

2. The vehicle locating system as recited in claim 1, further comprising a light emitting diode located on the external surface of the hand-held transponder, said light emitting diode being modulated by the signal strength modulator, thereby producing a flashing light effect when the hand-held transponder is separated from the vehicle-installed transponder by a substantial distance, which gradually becomes a steady beam of light upon closer approach of the hand-held transponder to the vehicle-installed transponder.

3. The vehicle locating system as recited in claim 2, further comprising a highly directional antenna within the hand-held transponder, which detects the homing signal generated by the vehicle-installed transponder in a highly directionally-sensitive manner, thereby causing the homing signal receiver and thus the period of the emitted sound and light to be highly sensitive to the direction in which the user points the hand-held transponder.

4. The vehicle locating system as recited in claim 3, wherein the vehicle-installed transponder further comprises a reset button, for canceling the homing signal after the vehicle has been located.

5. The vehicle locating system as recited in claim 4, wherein the hand-held transponder further comprises a locator activation button, for selectively causing the activation signal generator to produce an activation signal.

6. A method of using a vehicle locating system, by a user of a vehicle, to determine the location of the vehicle, said vehicle locating system having a hand-held transponder which is carried by a user upon exiting the vehicle, and also a vehicle-installed transponder which is left in the vehicle prior to exiting the vehicle, said hand-held transponder having an activation signal generator, a homing signal receiver, a tone generator, and a signal strength controlled modulator which operates in response to the homing signal receiver, wherein the tone generator is selectively modulated by the signal strength controlled modulator, said vehicle-installed transponder having an activation signal receiver and a homing signal generator, wherein said activation signal receiver communicates with the activation signal generator located within the hand-held transponder, wherein receipt of the activation signal subsequently causes the homing signal generator to transmit a homing signal which is transmitted for receipt by the homing signal receiver within the hand-held transponder, wherein said homing signal modulates the tone generator to output a series of discrete tones when the hand-held transponder and the vehicle-installed transponder are separated by a substantial distance and a weak homing signal is isolated by the homing signal receiver, and a steadier, less intermittent tone as the hand-held transponder approaches the vehicle-installed transponder and a strong signal is received by the homing signal receiver, comprising the steps of:

a) placing the vehicle-installed transponder within the vehicle;

b) parking of the vehicle by the user at a location;

c) carrying the hand-held transponder by the user upon exiting the vehicle;

d) generating an activation signal from the hand-held transponder by the user activating the activation signal generator;

e) producing a homing signal by the homing signal generator within the vehicle-installed transponder in response to receipt of the activation signal by the vehicle-installed transponder;

f) receiving and isolating the homing signal by the highly directional antenna and the homing signal receiver located within the hand-held transponder;

g) emitting a tone in response to the receipt of the homing signal;

h) modulating the tone by the signal strength controlled modulator, thereby producing an intermittent tone which varies to an uninterrupted tone as the hand-held transponder more closely approaches and is more precisely oriented at the vehicle; and i) locating the vehicle by the user, by walking in the direction which causes the tone generator to emit a steadier, uninterrupted tone.

7. The method of using a vehicle locating system as recited in claim 6, wherein the hand-held transponder further has an external surface and an internal surface, and wherein a light emitting diode is positioned upon the external surface of the hand-held transponder, said light emitting diode being modulated by the signal strength modulator, thereby producing a flashing light effect when the hand-held transponder is separated from the vehicle-installed transponder by a substantial distance, said flashing light gradually becoming a steady beam of light upon closer approach to the vehicle-installed transponder, wherein the step of locating the vehicle by the user, further comprises locating the vehicle by walking in the direction which causes the light emitting diode to emit a steadier, less interrupted beam of light.

* * * * *